Figure 1:
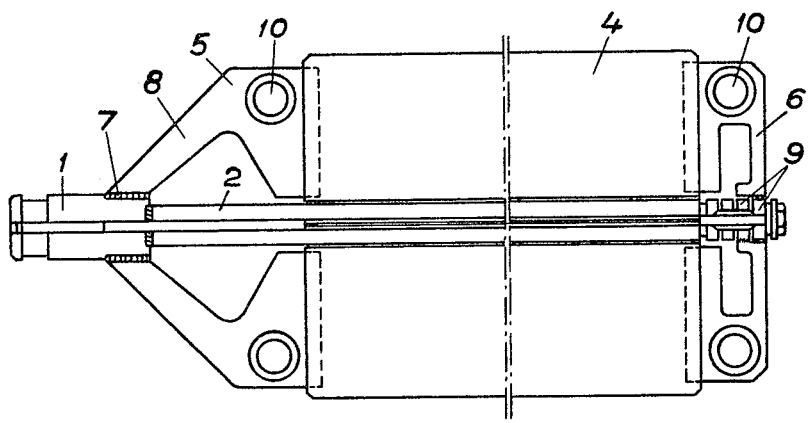

July 25, 1967  E. JONSSON ETAL  3,332,850
ABSORBER ROD FOR NUCLEAR REACTOR
Filed May 24, 1965  2 Sheets-Sheet 1

INVENTORS
ERIK JONSSON
INGVAR ÅSTE
AART VAN SANTEN
BY
Bailey, Stephens & Huettig
ATTORNEYS

3,332,850
ABSORBER ROD FOR NUCLEAR REACTOR

Erik Jonsson and Ingvar Aste, Vasteras, and Aart van Santen, Hokasen, Sweden, assignors to Allmanna Svenska Elektriska Aktiebolaget, Vasteras, Sweden, a corporation of Sweden
Filed May 24, 1965, Ser. No. 458,166
Claims priority, application Sweden, June 9, 1964, 6,982/64
14 Claims. (Cl. 176—86)

The present invention refers to an absorber rod for nuclear reactors which rod comprises a number of absorber blades fastened to a supporting member.

In certain types of nuclear reactors, for example light water reactors, whose power is regulated by means of absorber rods inserted in the reactor core, it is of considerable importance that the slots in the core which take up the absorber rods can be made as narrow as possible. The width of these slots is determined partly by the thickness of the absorber blades, but also to a considerable extent by the fact that a certain clearance must be present between the absorber blades and the limiting surfaces of the slot. This clearance is necessary in order to take up deviations from the theoretically correct form of the absorber rod which in practice always occur. Thus deviations with regard to straightness and angular position of the absorber blades means that said clearance must be relatively great in order that the absorber rods will not run the risk of becoming jammed. In dimensioning the slot, attention must be paid to changes of shape on account of uneven heating of the reactor core or the absorber rods.

The object of the present invention is to provide an absorber rod which allows the slots in the reactor core to be made considerably narrower than has hitherto been possible. The invention is characterised in that the absorber blades are arranged so that they have a certain freedom of movement in relation to the supporting member. Preferably the absorber blades have a partly limited freedom of movement as regards swinging round the longitudinal axis of the rod as well as axial freedom of movement at least at one end in relation to the supporting member. In order to further increase the flexiblity of the absorber rod, the absorber blades themselves can be made so thin that they themselves have a certain flexibility. The supporting member is made preferably of a central body which has longitudinal grooves taking up edges of the absorber blades.

According to a further development of the invention, the supporting member is fastened to the absorber blades only at their ends and between them it is arranged to allow the absorber blades freedom of movement at right angles to the blade plane. In this way by giving the absorber blades very great freedom of movement, it has become apparent that, contrary to what one would imagine, an absorber rod is obtained which in certain cases during operation is subjected to a lesser degree to oscillations which could lead to wear on the walls in the slots in the reactor core which receive the absorber blades. By giving the absorber blades freedom of movement at right angles to the blade plane, the oscillations which occur in the blades will be effectively dampened by the coolant of the reactor, which surrounds the absorber rods. If an absorber blade has a tendency to lie to one side of the surrounding slot, the pressure medium flowing on the side of the absorber blade where the distance to the slot wall is less will, because of the increased flow resistance, reach a higher pressure and thus counteract asymmetrical placing of the absorber blade in the slot.

Since the absorber blades in this embodiment of the invention only receive support from the supporting member at their end points and for the rest are completely free, they must be hung from the support member at their upper ends in order to avoid changes in shape because of their own weight. Further, on account of the great length of the absorber rods, the bar-shaped supporting member becomes too weak and requires some kind of guidance. Such a guidance is produced in a simple way by allowing the edges of the absorber blades turned against the supporting member to bear against it so that the supporting member is thereby trussed. It can also be feasible to provide the supporting member with guiding elements, for example resilient guide lugs or guide rollers for guidance against suitable guiding surfaces in the reactor core. Such suitable guiding surfaces constitute the corners of the so-called fuel boxes, which surround the absorber rod on all sides.

Figure 2:
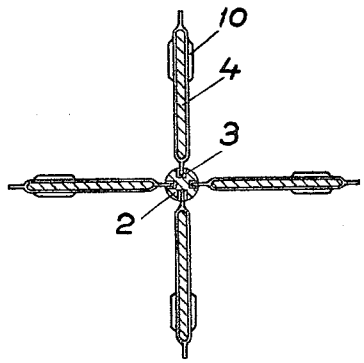
Figure 3:
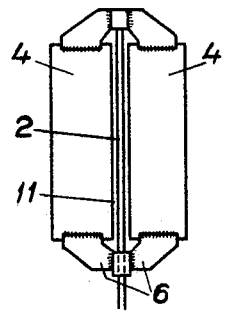
Figure 4:
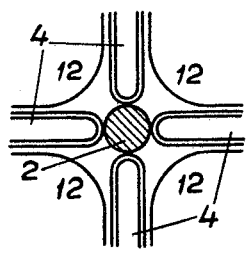
Figure 5:
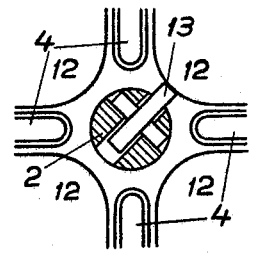
Figure 6:
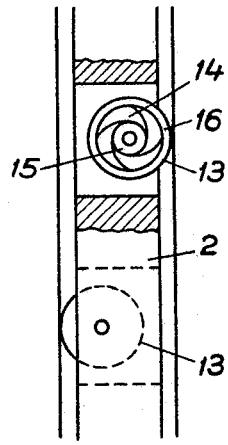
Figure 7:
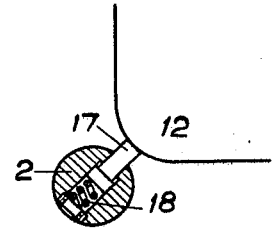

In the following the invention will be explained more fully with reference to the accompanying figures, which schematically show an embodiment of the invention. FIG. 1 shows a side view of an absorber rod and FIG. 2 a cross section of the rod of FIG. 1. FIG. 3 shows a side view of an absorber rod according to a second embodiment of the invention. FIG. 4 shows a cross section of a still somewhat different embodiment. FIGS. 5, 6 and 7 show different ways of guiding the supporting member against guiding surfaces in the reactor core.

In the figures, 1 denotes the part of the supporting member of the absorber rod to which a suitable operating means is fixed for axial displacement of the rod. From the part 1, a central body 2 extends along the whole length of the rod, which body is provided with longitudinal axial grooves 3, for receiving an edge of the absorber blades 4. The absorber blades are provided at each end with attachment plates 5 and 6, of which the plates 5 are welded at 7 to the supporting member. Next to the weld joint the attachment plates 5 consist of a narrow arm 8 which through elastic deformation gives a great deal of freedom of movement to the absorber blades. At the opposite end of the absorber blades at the attachment plates 6, the absorber blades are given even greater freedom of movement through mounting the attachment plates 6 with bearing means 9 round the central body 2. The bearing 9 allows turning movements as well as axial displacement. It is also feasible to make the attachment of the absorber blades alike at both ends, for example like the attachment plates 5 or like the attachment plates 6. In the latter case it is necessary that the angular movement of the absorber blades be limited by means of stop lugs or the like or by constructing the operating means so that it holds the blades 4 in the correct position.

Because the one long side of each absorber blade 4 is received in axial grooves 3 in the central body 2, each absorber blade gets a trussing guidance. The absorber blades and the central body together form a unit with the necessary stability, while at the same time each individual blade can be given the desired flexibility. The blades can be made relatively thin, so that the complete absorber rod has even greater flexibility and adaptability to the slot in the reactor core.

The attachment plates 5 and 6 are provided with guiding slide discs 10, which are dimensioned with reference to the smallest measurement of the width of the slot which can possibly occur in the reactor core. Such slide discs could possibly also be fixed on the absorber blades 4 themselves, which can be desirable, particularly if the absorber rod has a very great axial length.

Also in the embodiment according to FIG. 3, the absorber blades 4 are connected at each end with the supporting member by means of attachment plates 5 and 6, but this constitutes the only direct attachment of the absorber blades. Between the absorber blades and the supporting member 2, there is a free slot 11.

In FIG. 4 is shown how the supporting member 2 is merely trussed by means of the absorber blades 4 with their edges bearing against the supporting member. This bearing can be light and does not itself prevent the freedom of movement of the absorber blades.

FIG. 5 shows a way of supporting the supporting member 2 against guiding surfaces in the reactor core in an embodiment according to FIG. 3. The so-called fuel boxes are denoted by 12 and the supporting member 2 is provided with a plurality of resilient guide rollers 13, which bear against the corners of the fuel boxes 12.

In FIG. 6 is shown how a plurality of guide rollers 13 can be arranged at different levels in the supporting member 2, so that guidance can be obtained against all the four adjacent corners of the fuel boxes 12. In the figure only two control rollers are shown but it is self evident that the other control rollers are placed in the same way in a plate at right angles to the plane of the figure. The guide rollers are provided with resilient spokes 14 between the hub part 15 and the guide ring 16.

FIG. 7 shows a supporting member 2, which instead of guide rollers is provided with a guide lug 17, which is resiliently pressed by a spring 18 against the corner of a fuel box 12. Also in the embodiment according to FIG. 5 the guidance is of course applied against all the fuel boxes.

The invention is not limited to the shown embodiments, but a plurality of variations and modifications are feasible within the scope of the following claims.

What is claimed is:

1. Absorber rod for nuclear reactors, comprising an elongated supporting member, a plurality of absorber blades extending beside said member longitudinally thereof, and means fastening said absorber blades to said supporting member at at least two points spaced therealong, said means allowing freedom of movement of the absorber blades in relation to the supporting member.

2. Absorber rod according to claim 1, said fastening means allowing the said absorber blades a limited freedom of swinging movement substantially around the longitudinal axis of said absorber rod.

3. Absorber rod according to claim 2, said supporting member comprising a central body which is provided with longitudinal grooves engaging edges of said absorber blades, said grooves constituting a part of said fastening means.

4. Absorber rod according to claim 1, said supporting member being a central bar-like supporting member, said supporting member being fastened to said absorber blades only at their ends, whereby between their ends the blades are free to move at right angles to the blade plane.

5. Absorber rod according to claim 4, said absorber blades having their edges facing the supporting member bearing against said member, thereby trussing said supporting member.

6. Absorber rod according to claim 4, said absorber blades being hung from said supporting member at one end.

7. Absorber rod according to claim 4, said supporting member being provided with guide means for engagement against guiding surfaces in the core of a reactor provided with such absorber rods.

8. Absorber rod according to claim 7, said guide means comprising resilient guide lugs.

9. Absorber rod according to claim 7, said guide means comprising resilient guide rollers.

10. Absorber rod according to claim 1, said absorber blades having at least one end axially movable in relation to said supporting member.

11. Absorber rod according to claim 1, said absorber blades being thin and flexible.

12. Absorber rod according to claim 1, said fastening means including flexible attachment plates connecting said absorber blades at one end to said supporting member.

13. Absorber rod according to claim 12, said attachment plates having a narrow flexible part between said supporting member and each absorber blade.

14. Absorber rod according to claim 1, said fastening means including turnable and axially displaceable bearings connecting said absorber blades at one end to said supporting member.

References Cited
UNITED STATES PATENTS

| | | | |
|---|---|---|---|
| 3,158,545 | 11/1964 | Jones | 176—86 |
| 3,194,743 | 7/1965 | Deddens et al. | 176—86 |
| 3,198,709 | 8/1965 | MaComber | 176—86 |

CARL D. QUARFORTH, *Primary Examiner.*

L. DEWAYNE RUTLEDGE, *Examiner.*

H. E. BEHREND, *Assistant Examiner.*